United States Patent
Olabiyi (10) Patent No.: US 11,636,375 B2
(45) Date of Patent: Apr. 25, 2023

(54) ADVERSARIAL LEARNING OF DRIVING BEHAVIOR

(71) Applicant: Toyota Research Institute, Inc., Los Altos, CA (US)

(72) Inventor: Oluwatobi O. Olabiyi, San Jose, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 1230 days.

(21) Appl. No.: 15/906,197

(22) Filed: Feb. 27, 2018

(65) Prior Publication Data

US 2019/0266516 A1      Aug. 29, 2019

(51) Int. Cl.
*G06N 20/00* (2019.01)
*G05D 1/02* (2020.01)
*G05D 1/00* (2006.01)

(52) U.S. Cl.
CPC ........... *G06N 20/00* (2019.01); *G05D 1/0088* (2013.01); *G05D 1/0221* (2013.01)

(58) Field of Classification Search
CPC ... G06N 20/00; B60W 60/001; G08G 1/0112; G08G 1/166; G01C 21/00; G01C 21/3492; G01C 21/38; G01C 21/3476; G01C 7/04; G05D 1/0221; G05D 1/0088; G05D 1/0214; G05D 2201/0213; G01B 2210/14

See application file for complete search history.

(56) References Cited

U.S. PATENT DOCUMENTS

| | | | |
|---|---|---|---|
| 6,768,944 B2 | 7/2004 | Breed et al. | |
| 8,634,980 B1 | 1/2014 | Urmson et al. | |
| 9,645,577 B1* | 5/2017 | Frazzoli | B60W 30/0956 |
| 2002/0049539 A1* | 4/2002 | Russell | B60W 50/0097 |
| | | | 342/455 |
| 2008/0172177 A1 | 7/2008 | Sherony et al. | |
| 2010/0070171 A1 | 3/2010 | Barbeau et al. | |
| 2013/0238181 A1 | 9/2013 | James | |
| 2014/0195214 A1 | 7/2014 | Kozloski et al. | |
| 2014/0358840 A1 | 12/2014 | Tadic et al. | |
| 2016/0026182 A1 | 1/2016 | Boroditsky et al. | |

(Continued)

FOREIGN PATENT DOCUMENTS

| | | | | |
|---|---|---|---|---|
| EP | 3495219 A1 * | 6/2019 | | B60W 30/09 |
| WO | WO-2011057323 A1 * | 5/2011 | | G01C 21/005 |
| WO | WO-2016130719 A2 * | 8/2016 | | B60W 30/10 |

OTHER PUBLICATIONS

Morton et al., "Simultaneous Policy Learning and Latent State Inference for Imitating Driver Behavior", 2017 (7 pages).

(Continued)

*Primary Examiner* — Jeff A Burke
*Assistant Examiner* — Christopher A Buksa
(74) *Attorney, Agent, or Firm* — Christopher G. Darrow; Darrow Mustafa PC (57) ABSTRACT

Embodiments described herein disclose methods and systems for adversarial learning in autonomous vehicle path modeling. The systems and methods collect states of the vehicle in the environment to predict a path. The predicted path is compared for variance from an actual path. The variance between the paths, in light of other data, is used to modify the driving models, to create more accurate representations of expert driving in autonomous vehicle path generation.

22 Claims, 4 Drawing Sheets

(56) References Cited

U.S. PATENT DOCUMENTS

| | | | |
|---|---|---|---|
| 2016/0107682 A1* | 4/2016 | Tan | G05D 1/0212 |
| | | | 701/41 |
| 2017/0229029 A1* | 8/2017 | Klinger | G01S 13/02 |
| 2018/0024553 A1* | 1/2018 | Kong | G05D 1/0248 |
| | | | 701/26 |

OTHER PUBLICATIONS

Bojarski et al., "End to End Learning for Self-Driving Cars", 2016 (9 pages).

Galceran et al., "Multipolicy Decision-Making for Autonomous Driving via Changepoint-based Behavior Prediction", 2015 (10 pages).

Kuefler et al., "Imitating Driver Behavior with Generative Adversarial Networks", 2017 (8 pages).

El Sallab, et al., "Deep Reinforcement Learning framework for Autonomous Driving", 2017 (7 pages).

Shalev-Shwartz, et al. "Long-term Planning by Short-term Prediction", 2016 (9 pages).

Chen, et al. "DeepDriving: Leraning Affordance for Direct Perception in Autonomous Driving", 2015 (9 pages).

Tamari, "Reinforce Framework for Stochastic Policy Optimization and its use in Deep Learning", The Hebrew University of Jerusalem, Advanced Seminar in Deep Learning (#67679), Feb. 28, 2016 (38 pages).

Duan et al., "Benchmarking Deep Reinforcement Learning for Continuous Control", Proceedings of the 33rd International Conference on Machine Learning (ICML), 2016 (14 pages).

Lillicrap et al., "Continuous Control with Deep Reinforcement Learning," 2015 (14 pages).

Schmidhuber, "Reinforcement Learning in Markovian and Non-Markovian Environments", Advances in neural Information processing systems 3, 1990 (7 pages).

* cited by examiner

ADVERSARIAL LEARNING OF DRIVING BEHAVIOR

FIELD

The subject matter described herein generally relates to prediction of driving behavior and, more particularly, to human driving behavior modeling.

BACKGROUND

Autonomous vehicles, such as vehicles which do not require a human driver, can be used to aid in the transport of passengers or items from one location to another. An important component of an autonomous vehicle system is the autonomous driving system, which allows the vehicle to receive information about its surroundings using, for example, cameras, radar, sensors, and other similar devices and develop a navigation path accordingly. The autonomous driving system executes numerous decisions while the autonomous vehicle is in motion, such as speeding up, slowing down, stopping, turning, and path selection. Autonomous vehicles can also use the cameras, sensors, and global positioning devices to gather and interpret images and sensor data about its surrounding environment, e.g., pedestrians, bicyclists, other vehicles, parked cars, trees, buildings, etc. These systems generally use a combination of the above systems to select a path through which the vehicle can safely navigate the environment.

Current autonomous driving systems include sensor inputs that have data associated with the vehicle's destination, preprogrammed path information, and detected obstacle information. Based on one or more of data associated with the information above, the vehicle's path is determined and vehicle movements are controlled. Detecting obstacles, however, may provide false data points, incomplete obstacle data, and/or require large amounts of electronic storage capacity and processing power to compute the relevant data points. Additionally, combining obstacle data with trajectory or directional information may result in vehicle movements that may be characterized as jerky or incorrect. As autonomous vehicles are generally intended to carry human passengers or sensitive cargo (e.g., packages), the fluidity of the path chosen by the vehicle can benefit by being closer to a human driving style.

SUMMARY

The systems and methods described herein use predicted data as compared to expert driver behavior in a vehicle environment to improve autonomous vehicle path creation. In one embodiment, an adversarial learning system for path comparison in autonomous learning is disclosed. The adversarial learning system can include one or more processors; and a memory communicably coupled to the one or more processors. The memory can store a generator module including instructions that when executed by the one or more processors cause the one or more processors to generate a predicted path between an origin and a destination for a vehicle using an autonomous driving model. The memory can further store a detection module including instructions that when executed by the one or more processors cause the one or more processors to obtain an actual path driven by an operator of the vehicle between the origin and the destination. The memory can further store a discriminator module including instructions that when executed by the one or more processors cause the one or more processors to calculate a variance factor using the predicted path and the actual path, and to modify the autonomous driving model using the variance factor, the modified model useable to autonomously drive the vehicle.

In another embodiment, a non-transitory computer-readable medium for path comparison in autonomous learning is disclosed. The non-transitory computer-readable medium can store instructions that when executed by one or more processors cause the one or more processors to generate a predicted path between an origin and a destination for a vehicle using an autonomous driving model. The non-transitory computer-readable medium can further store instructions to obtain an actual path driven by an operator of the vehicle between the origin and the destination. The non-transitory computer-readable medium can further store instructions to calculate a variance factor using the predicted path and the actual path. The non-transitory computer-readable medium can further store instructions to modify the autonomous driving model using the variance factor, the modified model useable to autonomously drive the vehicle.

In another embodiment, a method for path comparison in autonomous learning is disclosed. The method can include generating a predicted path between an origin and a destination for a vehicle using an autonomous driving model. The method can further include obtaining an actual path driven by an operator of the vehicle between the origin and the destination. The method can further include calculating a variance factor using the predicted path and the actual path. The method can further include modifying the autonomous driving model using the variance factor, the modified model useable to autonomously drive the vehicle.

BRIEF DESCRIPTION OF THE DRAWINGS

So that the manner in which the above recited features of the present disclosure can be understood in detail, a more particular description of the disclosure, briefly summarized above, may be had by reference to the embodiments, some of which are illustrated in the appended drawings. It is to be noted, however, that the appended drawings illustrate only typical embodiments of this disclosure and are therefore not to be considered limiting of its scope. The disclosure may admit to other equally effective embodiments.

To facilitate understanding, identical reference numerals have been used, wherever possible, to designate identical elements that are common to the Figures. Additionally, elements of one embodiment may be advantageously adapted for utilization in other embodiments described herein.

DETAILED DESCRIPTION

Embodiments disclosed herein describe systems and methods for object recognition using optimal experimental design (hereinafter referred to as "adversarial learning") in a vehicular environment. This invention generally includes a generator and a discriminator. As will be discussed in greater detail below, the generator predicts a path that the vehicle will execute. The discriminator is used to determine a difference between the predicted path and the path executed by the vehicle.

Inputs to the system include states of the vehicle and context information. The current state includes the current state(s) of the vehicle, such as the vehicle's pose, velocity, acceleration, etc. The historical state includes past action(s) of the vehicle, such as the controls for the vehicle's steering, throttle, brake, shifters, directional components, trajectory, etc. In this regard, the x-state corresponds to the current position of the vehicle, and the a-state corresponds to a path that the vehicle previously took. The context information includes data that relates to the vehicle's current environment (e.g., map data, sensor data, etc.). In some examples, the vehicle is controlled by an expert driver. While subject to expert driver control, the vehicle may be in a learning mode. The learning mode can be used to refine models of the vehicle that are used to generate paths of the vehicle.

Each of the inputs are provided to an encoder. The encoder formats the inputs to provide data to the generator and the discriminator in the proper format. While one encoder is provided, in some examples as presented and described herein, the generator and discriminator can have separate encoders. Such examples may simplify the requirements of each respective encoder, and thus reduce processing power.

First, the generator can receive the inputs from the encoder and generates a first path ($a_{t+1:t+Hf}$) that the vehicle will execute, according to a model. The path generated by the generator can be an estimated path that the vehicle can execute. The estimated path can differ from what the vehicle actually executes. This embodiment can be relevant when the vehicle is operated in a learning mode (e.g., the vehicle is not operated in an autonomous mode). In some examples, the generator can generate multiple paths.

Next, the discriminator can receive the inputs from the encoder. The discriminator can also receive, as an input, the path generated by the generator. The inputs received by the discriminator from the encoder can be used for referencing the path generated by the generator. In this embodiment, the discriminator can use the inputs from the encoder as a temporal indicator for comparing the path that the generator generated to what the path the vehicle actually executed. The discriminator can then calculate a variance factor ($r_t$) which incorporates the difference between the path generated by the generator and the path executed by the vehicle. The factor can then be used by the discriminator to refine the model used by the generator. In one example, the factor increases towards one (1) when the paths converge, and the factor decreases towards zero (0) as the paths diverge.

As stated, the variance factor can be used for updating the generator's model. In this regard, the generator can improve the generated paths based on deviations from the path executed by the expert driver. Further, the variance factor can be used to rank paths according to which path has the highest variance factor (i.e., which path is closest to what the expert driver would do while driving the vehicle). The paths which are ranked highest variance factor (i.e., having the lowest difference between the model and the expert driver's actions) can be used for selecting a path to implement during autonomous driving. Elements of the embodiments disclosed herein are more clearly described with relation to the figures below.

Figure 1:
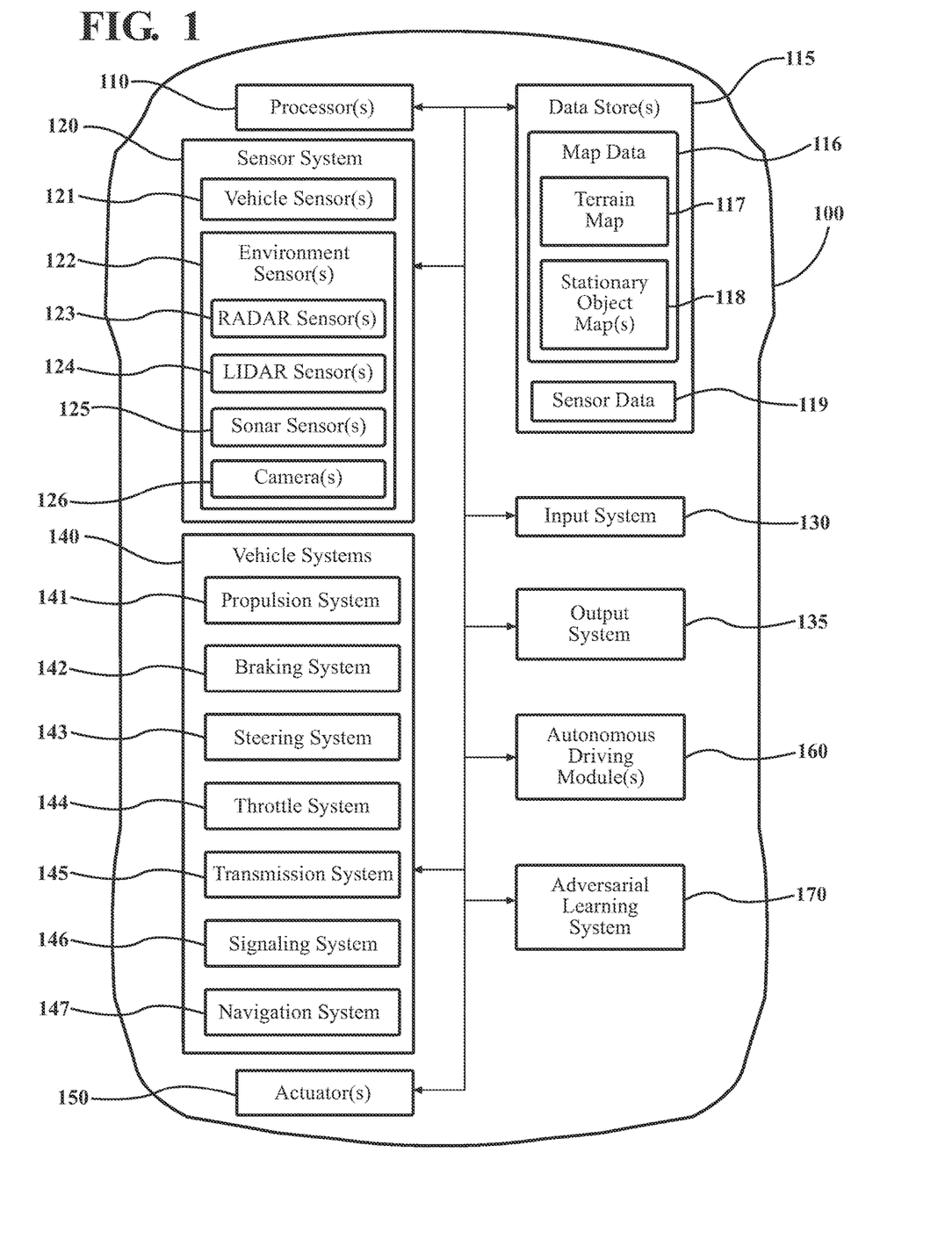
FIG. 1 is a diagram of a vehicle incorporating an adversarial learning system, according to embodiments described herein.

Referring to FIG. 1, an example of a vehicle 100 is illustrated. As used herein, a "vehicle" is any form of motorized transport. In one or more embodiments, the vehicle 100 is an automobile. While arrangements will be described herein with respect to automobiles, it will be understood that embodiments are not limited to automobiles. In some embodiments, the vehicle 100 may be any other form of motorized transport that, for example, can operate at least semi-autonomously, includes an adversarial learning system or capabilities to support an adversarial learning system, and thus benefits from the functionality discussed herein. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous driving module 160 fails to properly respond or is otherwise unable to adequately control the vehicle 100.

The vehicle 100 can include a processor 110. In one or more arrangements, the processor 110 can be a main processor of the vehicle 100. In one example, the processor 110 can be an electronic control unit (ECU). Depending on the desired configuration, the processor 110 can be of any type for use in the data processing and analysis described herein. The processor 110 can be a microprocessor (P), a microcontroller (C), a digital signal processor (DSP), or any combination thereof. The processor 110 can be a set of one or more processors or can be a multi-processor core, depending on the particular implementation. Further, processor 110 can be one or more heterogeneous processor systems, in which a main processor is present with secondary processors on a single chip. In another example, the processor 110 can be a symmetric multi-processor system containing multiple processors of the same type. Further combinations or permutations of the processor 110 are contemplated without specific recitation herein.

The vehicle 100 can include a data store 115. The data store 115 is any piece of hardware that is capable of storing data or information. Examples of data or information which can be stored in the data store 115 include, without limitation, data, program code in functional form, and/or other suitable information either on a temporary basis and/or a permanent basis. The data store 115 can include one or more modules that include computer readable instructions that, when executed by the processor 110, cause the processor 110 to perform methods and functions that are discussed herein. The data store 115 can include volatile and/or non-volatile memory. An example of the data store 115 can include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operably connected to the processor 110 for use thereby. The media used by data store 115 can be removable. For example, a removable hard drive can be used for data store 115. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road surface markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more stationary object maps 118. The stationary object map(s) 118 can include information about one or more stationary objects located within one or more geographic areas. A "stationary object" is a physical object whose position does not change or substantially change over a period of time and/or whose size does not change or substantially change over a period of time. Examples of stationary objects include trees, buildings, curbs, fences, railings, medians, utility poles, statues, monuments, signs, benches, furniture, mailboxes, large rocks, hills. The stationary objects can be objects that extend above ground level. The one or more stationary objects included in the stationary object map(s) 118 can have location data, size data, dimension data, material data, and/or other data associated with it. The stationary object map(s) 118 can include measurements, dimensions, distances, and/or information for one or more stationary objects. The stationary object map(s) 118 can be high quality and/or highly detailed. The stationary object map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, system or combination thereof that can detect and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor 110, the data store 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The input system 130 can include one or more connections, either wired or wireless, for communication between other devices storing information and the vehicle 100. The input system 130 can be any suitable communication interface depending on device type and include, but is not limited to, USB (universal serial bus), frame grabber, Ethernet, or Firewire. The input system 130 can include components suitable for communication with devices, locally or remotely, such as over a network protocol (e.g., Ethernet or similar protocols). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The vehicle 100 further includes an adversarial learning system 170 that is implemented to perform methods and other functions as disclosed herein relating to path modification and improvement based on adversarial comparison of predicted paths and actual driving paths, as provided by expert drivers. The vehicle 100 can also include a plurality of modules integrated with or interacting with the adversarial learning system 170, for the comparison of driving data and environment data to the predicted path. The modules usable with the adversarial learning system 170 are described with reference to FIG. 2 below.

The processor 110, the adversarial learning system 170, and/or the autonomous driving module(s) 160 can be operably connected to communicate with the various embodiments of the vehicle systems 140 and/or individual components thereof. For example, the processor 110, the adversarial learning system 170, and/or the autonomous driving module(s) 160 can be in communication to send and/or receive information from the various embodiments of the vehicle systems 140 to control the movement, speed, maneuvering, heading, direction, etc. of the vehicle 100. The processor 110, the adversarial learning system 170, and/or the autonomous driving module(s) 160 may control some or all of these vehicle systems 140 and, thus, may be partially or fully autonomous.

The processor 110, the adversarial learning system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor 110, the adversarial learning system 170, and/or the autonomous driving module(s) 160 can control the direction and/or speed of the vehicle 100. The processor 110, the adversarial learning system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor 110, or one or more of the modules can be executed on and/or distributed among other processing systems to which the processor 110 is operably connected. The modules can include instructions (e.g., program logic) executable by one or more processor 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120, the adversarial learning system 170, and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the adversarial learning system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Figure 2:
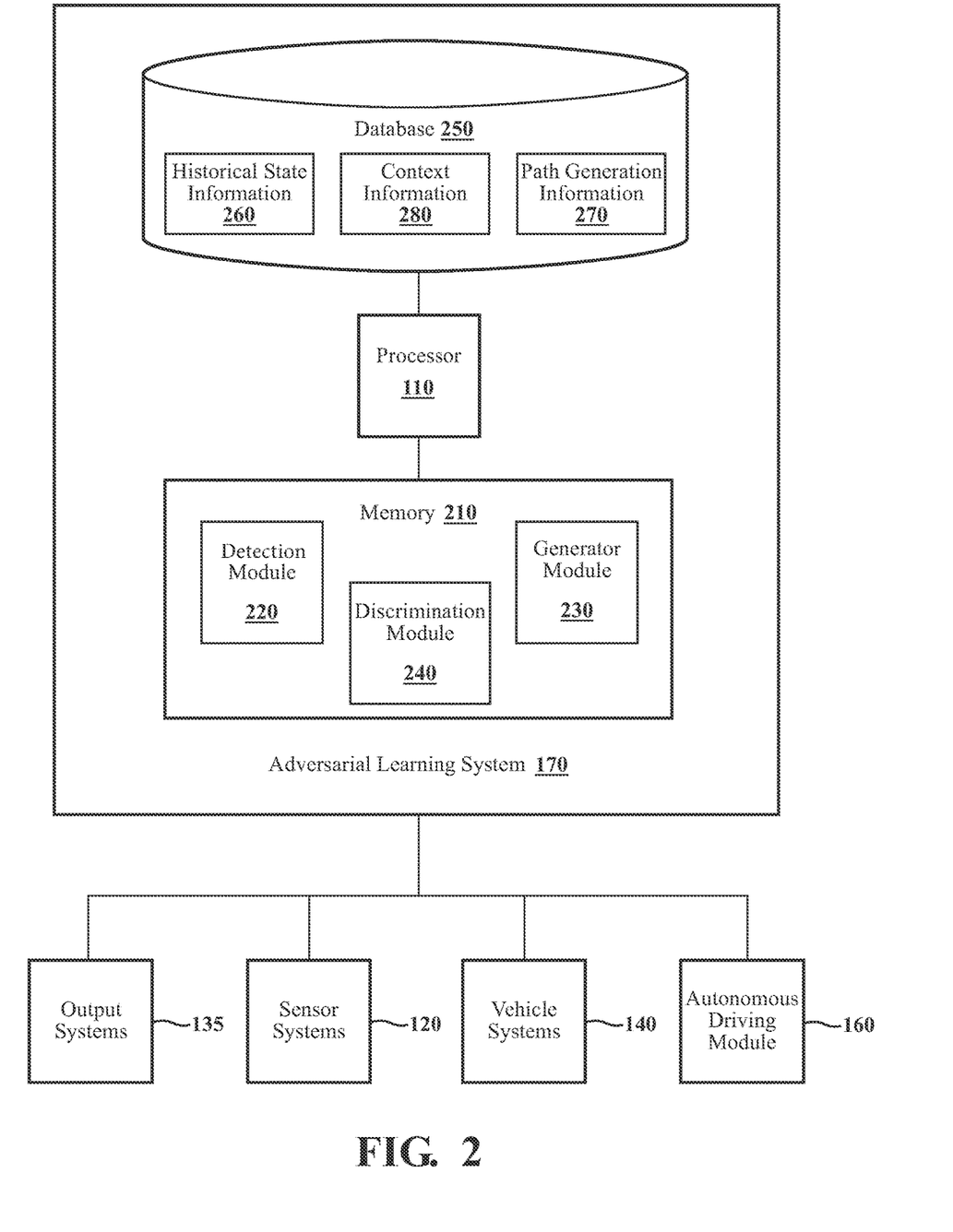
FIG. 2 is an illustration of an adversarial learning system, according to embodiments described herein.

With reference to FIG. 2, one embodiment of the adversarial learning system 170 of FIG. 1 is further illustrated. The adversarial learning system 170, described herein, employs adversarial learning between a predicted path and an actual path to improve modeling of the navigation paths in autonomous driving. As practically applied, the adversarial learning system 170 can produce a predicted path from an initial point (e.g., an origin) to a destination point (e.g., a destination) based on a first current state of the vehicle, first historical states of the vehicle and first context information. This can be done while the vehicle is in a learning mode, such as under the control of an expert driver. The expert driver can then control the vehicle between the origin and the destination, creating an actual path. Then, a second current state of the vehicle, second historical states of the vehicle and second context information can be collected to provide additional information about the actual path. The adversarial learning system 170 can then compare the predicted path and the actual path in light of the above information to create a variance factor. In this way, information from the driving of an expert driver can be incorporated into path predictions and can be used to update the paths actually used by the autonomous driving module 160.

The adversarial learning system 170 is shown as including the processor 110 from the vehicle 100 of FIG. 1. Accordingly, the processor 110 can be a part of the adversarial learning system 170, the adversarial learning system 170 can include a separate processor from the processor 110 of the vehicle 100, or the adversarial learning system 170 can access the processor 110 through a data bus or another communication path. In one embodiment, the adversarial learning system 170 includes a memory 210 that stores a detection module 220, a generator module 230, and a discriminator module 240. The memory 210 can be a random-access memory (RAM), read-only memory (ROM), a hard-disk drive, a flash memory, or other suitable memory for storing the modules 220, 230, and 240. In one example, the modules 220, 230, and 240 are computer-readable instructions that when executed by the processor 110, cause the processor 110 to perform the various functions disclosed herein.

With continued reference to the adversarial learning system 170, in one embodiment, the adversarial learning system 170 includes the database 250. The database 250 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 250 stores data used by the modules 220, 230, and 240 in executing various functions. In one embodiment, the database 250 includes historical state information 260 collected by the sensor systems 120 and used by the detection module 220 in addition to further data used by the adversarial learning system 170 such as path generation information 270 and context information 280.

The adversarial learning system 170 can include the detection module 220. The detection module 220, as stored in the memory 210, can include instructions that function to control the one or more processors, such as processor 110, to receive and encode information for use by further modules. The instructions, when executed by the one or more processors, cause the one or more processors to receive a current state, a historical state, and context information of a vehicle. The detection module 220 can receive a variety of inputs, such as from the sensor systems 120, described above with reference to FIG. 1. Inputs to the detection module 220 include a first current state of the vehicle, a second current state of the vehicle, a first historical state of the vehicle, a second historical state of the vehicle, a first context information, and a second context information. In one embodiment, the first current state corresponds to the current position of the vehicle, the first historical state corresponds to a path that the vehicle previously took, and the first context information corresponds to environmental information. The first current state, the first historical state, and the first context information can be determined or modified, at least, based on data collected at the origin. In another embodiment, the second current state corresponds to the current position of the vehicle, the second historical state corresponds to a path that the vehicle previously took, and the second context information corresponds to environmental information. The second current state, the second historical state, and the second context information can be determined or modified, at least, based on data collected at the destination. With consideration of one or more shared aspects, the first current state and the second current state may be referred to as "the current states", the first historical state and the second historical state may be referred to as "the historical states", and the first context information and the second context information can be referred to as "the context information" herein.

The current states of the vehicle can include current factors or measurements related to the vehicle itself. The current states of the vehicle can include data regarding the vehicle itself, such as position of wheels, vehicle pose, engine data, velocity, acceleration, response time and other information on the vehicle. The current states of the vehicle can further include data regarding the vehicle's interaction to the environment, such as driver actions, vehicle traction, braking issues, relationship of the vehicle to road surface markings and the like. The current states can include the vehicle's most recent information regarding immediate actions within an environment, such as an instantaneous time frame and the associated action by vehicle 100. In another embodiment, the current states can include a time frame including or related to the above described vehicle's most recent information. Here, the current information can include data taken from a time frame, or window of time, related to the current time, such as information or data collected about the vehicle 100 within 30 seconds of T=0, where T=0 is the current time with relation to the vehicle. The current states of the vehicle can be derived or received from a number of sources. In one embodiment, the current states of the vehicle can be collected by one or more sensors, such as by a sensor system 120, described with reference to FIG. 1. In another embodiment, the current states of the vehicle may be estimated or approximated using data from the autonomous driving module 160, vehicle systems 140 or combinations thereof.

The historical states can include details related to the vehicle's past autonomous or driver-assisted actions or positions. In one embodiment, the historical states of the vehicle includes data regarding the vehicle itself, such as the controls for the vehicle's steering, throttle, brake, shifters, directional components, trajectory, and other. In another embodiment, the historical states of the vehicle can include actions taken by a previous driver or previous autonomous path information, such as turns, starts, braking, acceleration, and other maneuvers. The historical states can, in some embodiments, be stored as historical state information 260. The historical state information 260 may be part of a database, such as the database 250. Though the database 250 is shown as part of the adversarial learning system 170, the database 250 can be part of the adversarial learning system 170, part of the vehicle 100, or remote from the vehicle 100. When the database is remote from the vehicle 100, the adversarial learning system 170 can access the database using a remote input system, such as the input system 130, descried with reference to FIG. 1.

The context information 280 can include data that relates to the vehicle's current environment (e.g., map data, sensor data, etc.). In general, reference to the environment of the vehicle, as used herein, relates to the visible area, or portions thereof, as detected by the vehicle through the sensor system (hereinafter referred to as "environmental data"), including information about the environment detected by the vehicle 100, whether local or remote, and objects in the environment. Context information 280 can include elements which are static in the environment, such as buildings, signs, statues, or other objects which do not generally change position, or only change position within a fixed path, such as a garage door. Stationary objects are objects occur with regular frequency in the environment and not associated with movement by a person or another actor. The environmental data can further include information about said stationary objects. The information about the stationary objects can include structural and positioning information, such as the pose (i.e., the position and orientation) of the object, composition, details of personal ownership, length of time in the environment date of arrival, and other location and historical information about the object.

The context information 280 can further include dynamic objects. Dynamic objects are objects that move or change within the environment. Dynamic objects, as used herein, is understood in the sense of an object recognition scheme. As such, the word "objects" includes living objects such as animals and people, as well as inanimate objects such as cars or bicycles. Information about the dynamic objects can include any or all information described with reference to the stationary objects including pose information, movement within the environment, time of entry, path or translation through the environment over time, actual and hypothetical interactions with other objects or the environment, and other data to reflect the changing nature of dynamic objects. The environmental data, which can be included in the context information 280, can include the location (e.g., an intersection), the environmental parameters (e.g., temperature, humidity, and other environmental factors), size and boundaries of the environment (e.g., walls, obstacles, etc.). The environmental data can also include stationary objects in the environment which are designed or otherwise used to interact with a dynamic object (e.g., a stop sign for a vehicle's lane of traffic, a speed bump, etc).

The detection module 220 provides instructions that, when executed by the processor 110, cause the processor 110 to encode a first input and a second input using the current states, the historical states, and the context information. The detection module 220 receives and formats the above described inputs to provide data to the generator module 230 and the discriminator module 240 and other information from the sensor system, in a useable format. In one embodiment, the detection module 220 receives data such as context information, the current states of the vehicle and the historical states of the vehicle. The detection module 220 can encode the received input into a variety of outputs usable by the generator module 230, the discriminator module 240 or both. The outputs can include predicted states, predicted actions and predicted observations of the vehicle or of other objects within the environment. In one example, the detection module 220 receives data from the sensor system 120 about a first vehicle traveling at a first speed. The first vehicle then begins to decelerate to a second speed and the wheels angle to the right. The detection module 220 then processes the above information and forwards an output to the generator module 230, stating that the first vehicle will be making a right hand turn.

These outputs can be prepared as a first input and a second input. The first input can be a combination of outputs, encoded by the detection module 220, which provide information about the environment and objects, available at least at the origin, such that a predicted path can be generated by the generator module 230. Thus, the first input can include components from the first current state, the first historical state and the first context information from the context information 280, including traffic information, object recognition, predicted actions, predicted states and predicted observations. The second input can be a combination of outputs, encoded by the detection module 220, which provide information about the environment and objects such that the predicted path can be analyzed for variance by the discriminator module 240. The second input can reflect information available at the origin, the destination, at points in between the two or combinations thereof As such, the second input can include information provided in the first input as well as information collected after the predicted path is generated and the corresponding path (e.g., an actual path) has been traveled. Described here, the second input includes components from the second current state, the second historical state and the second context information from the context information 280.

While one detection module 220 is shown in the example provided in FIG. 2, this is not intended to be limiting. In some examples, the generator module 230 and the discriminator module 240 can each have a detection module 220. In one example, the generator module 230 has one (1) detection module 220 and the discriminator module 240 has one (1) detection module 220. In this embodiment, the detection module 220 can be dedicated to processing, through the processor 110, input based on the needs of the respective module (e.g., either the generator module 230 or the discriminator module 240). Any and all of the above modules 220, 230 and 240 can have an independent processor 110, such that processing tasks are handled through a different processor for each module. By reducing processing load on any one detection module 220, the requirements of each respective detection module 220 can be simplified. As well, the use of more than one detection module 220 can ultimately reduce processing power by increasing useful life and reducing premature wear.

The first input can then be received by the generator module 230. The generator module 230, as stored in the memory 210, can include instructions that function to control the one or more processors, such as processor 110, to receive and encode information for use by further modules. In one embodiment, the generator module can include instructions to generate a predicted path between an origin and a destination for a vehicle using an autonomous driving model. The instructions, when executed by the one or more processors, cause the one or more processors to generate a predicted path using the first input. The predicted path is a path for a specific route, based on modeled information, that is intended to replicate optimal driving behaviors from a starting point (e.g., an origin) to a finish point (e.g., a destination). Optimal driving behaviors can include any driving behaviors which safely and efficiently carry a passenger from the starting point to the finish point, without unduly harming or discomforting the passenger, such as ordinary, intermediate, or expert human driving behaviors. The predicted path generated by the generator module 230 can be an estimated, or predicted, path that the vehicle will execute, including predicted speeds and predicted acceleration over that path. The predicted path can be generated between the origin and the destination. The predicted path can be a generated path from the origin to the destination, using one or more modeled behaviors. The predicted path can be generated in light of known or anticipated possibilities within the environment. The modeled behaviors can be an accumulation of collected information regarding expected human behaviors for a variety of situations, such as obstacle avoidance, distance from surrounding vehicles, curb distance (such as for parking), response to traffic signals, and the like. Modeled behaviors, such as the autonomous driving model, can be stored as part of the path generation information 270. The path generation information 270 can include a collection of all information regarding current and previous paths, including modeled behaviors, success rate, variance between paths, adjustments over time in path modeling, modeling sources, and related information. The path generation information 270 can be stored in the database 250 in the same manner as described with reference to the historical state information 260.

The generator module 230 can then, through instructions executed by the one or more processors, use the first input and the path generation information 270 to generate the predicted path. The predicted path, in this context, is an automated approximation of the vehicle's path, rather than what the vehicle 100 actually executes. In some embodiments, the vehicle is operated in a learning mode (e.g., the vehicle is not operated in an autonomous mode). In some examples, the generator module 230 can generate multiple paths, such as if there are conflicting modeled behaviors based on the first input. In one example, the avoidance of an obstacle between the origin and the destination can be achieved by moving left or by moving right. All other factors being equal, the generator module 230 can generate two paths to address both possibilities. In future iterations, the comparison between the predicted path and the actual path can provide guidance on path selection (e.g., predicted path excluded based on the human driver choice).

The predicted path can be forwarded to a variety of systems and modules within and outside of the vehicle 100. In one embodiment, the predicted path can be forwarded to the autonomous driving module 160 of the vehicle 100. The autonomous driving module 160 can then implement the predicted path, such as when the vehicle 100 is an autonomous driving or hybrid driving mode. In another embodiment, the predicted path can be forwarded to the discriminator module 240, such that the discriminator module can compare the predicted path and the actual path. The actual path can be generated based on an expert human driver, hybrid driving interaction, or changes to the predicted path during operation, such as due to newly acquired information. In another embodiment, the predicted path can be forwarded to the database 250, for storage as part of the path generation information 270. In another embodiment, the predicted path can be distributed to other vehicles or other adversarial learning systems through the output system 135. In this way, the predicted path generated here can be shared with other vehicles having an adversarial learning system, which provide the capabilities described with reference to the adversarial learning systems 170 of vehicle 100. Combinations two or more of the above embodiments are contemplated, without explicit recitation herein.

The actual path and the second input can be obtained and encoded by the detection module 220 after the predicted path is generated. The second input is derived for the second current state, the second historical state and the second context information. The actual path is the path actually followed by the vehicle, such as when the vehicle is under the control of an expert driver. When the vehicle 100 is in a learning mode, is either partially or completely under the control of a human driver. Thus, the vehicle 100 is receiving expert driver information. The expert driver can navigate the vehicle 100 between an origin and a destination and producing data regarding driving habits, avoidance techniques and other facets of human based driving. As such, the sensor systems 120 are collecting the actual path, and new information about the current state of the vehicle for the second current state. The current states are temporally related to the present time, thus making previous "current states", historical states once the time frame has passed. As such, new data not available when the first current state, the first historical state and the first context information were created, can be incorporated into the second current state, the second historical state and the second context information respectively. This is in addition to all information and data available to the detection module 220, when the first state was encoded.

The detection module 220 can then forward the second input and the actual path to the discriminator module 240. The discriminator module 240, as stored in the memory 210, can include instructions that function to control the one or more processors, such as processor 110, to receive and encode information for use by further modules. The instructions, when executed by the one or more processors, cause the one or more processors to receive the predicted path from the generator and to receive the second input from the detection module 220. The second input can further include the actual path. In one embodiment, the second input and the predicted path are delivered in an iterative approach, such that specific frames of time during the travelling of the actual path, are compared instantaneously to the related portion of the predicted path. In another embodiment, the second input and the predicted path are delivered and compared once the vehicle 100 has traveled from the origin to the destination. Here, the vehicle 100 can travel from the origin to the destination, to create a full actual path. Then, the actual path is provided alongside the other data available in the second input to the discriminator module 240. The discriminator module 240 then uses the previously received predicted path, as well as data available in the first input and the second input, to compare the two paths. Of note, though the predicted path is described as being created temporally earlier than the actual path, the time frame of generating the predicted path is not intended to be limiting. The predicted path can be generated by the generator module 230 at any time before, during or after the vehicle 100 travels the actual path, so long as the actual path is not used to influence the creation or parameters of the predicted path.

The discriminator module 240 can then calculate a variance factor using the actual path as compared to the predicted path. The variance factor is a comparison of the difference between the predicted path and the actual path. In one example, the variance factor can be a statistical comparison. The variance factor can include one or more components, which reflect a variety of levels of comparison. In one embodiment, the variance factor can include a single number, which is a comparison of the overall actual path to the overall predicted path. In another embodiment, the variance factor can include a plurality of numbers which indicate a temporal comparison of the actual path and the predicted path over a period of time. The period of time can be the time frame from the origin to the destination, or any component thereof. The variance factor can be a number or a scale of numbers indicating convergence or divergence. In one example, the variance factors is a scale of numbers between 1 and 0, where 1 indicates complete convergence and 0 indicates complete divergence. In this case, the predicted path and the actual path are compared to determine, on the scale described, how much the predicted path differs from the actual path.

In another embodiment, the variance factor can be calculated in light of 6 degrees of freedom for the vehicle. The six degrees of freedom, as used here, are defined as movement and rotation in relation to a three-dimensional plane. Described with reference to a single object having a known starting position and direction, movement backwards and forwards (referred to as "surge"), left or right (referred to as "sway"), and up or down (referred to as "heave"), corresponds to movement on Z, X and Y planes respectively. Yaw is rotation about the Y plane. Pitch is rotation about the X plane. Roll is rotation about the Z plane. As such, the variance factor can be calculated alongside the relative surge, sway, heave, yaw, pitch, and roll, of the vehicle, as appropriate.

The variance factor can be used to update one or more components of the adversarial learning system 170. In one embodiment, the adversarial learning system 170 can update travel paths, as generated by the autonomous driving module, using the predicted paths and the variance factor. The predicted paths can be shifted in one or more direction based on the variance factor and associated data from the second input. In one example, the predicted path includes movement 2 feet from a road marker and a quick motion to dodge an obstacle, where the expert driver moved 3 feet from the road marker (e.g., a lane divider) followed by a gentle glide into a position 2 feet from the road marker once the obstacle was passed. The movement both left and right, in relation to forward momentum of the vehicle, as compared to the predicted path can be used to generate the variance factor for this portion of the actual path and the predicted path. The variance factor can then be employed to modify the predicted path, creating a modified path.

The variance factor, either directly or through the modified path, can then be incorporated into the path generation information. The variance factor at specific temporally related points of reference can be applied to the autonomous driving model(s), such that the model prediction under a specific situation is adjusted. In one example, the autonomous driving models are adjusted by increasing or reducing compensation of the vehicle in light of a variance factor which shows overcompensation in the predicted path. In another embodiment, the modified path is presented to through the generator module 230 to determine specific path generation information which would be required for generating a predicted path which matches the modified path. The path generation information is then used to modify equivalent data points, such that the autonomous driving models are more capable of replicating the modified path in future initiations of the generator module 230. Further guidance regarding improved modeling can be gained by employing the current states and historical states from the vehicle 100 during the performance of the actual path. In one embodiment, the variance factor is applied to the autonomous driving model(s) including the relatively minimal pitch and yaw rotational movement of the vehicle on the actual path, which can be available from the second historical state, which indicates gentler maneuvering.

The system described here modifies the autonomous driving model(s), rather than simply mimicking human driving as seen in behavioral cloning. Behavioral cloning is a method by which human behaviors can be captured and reproduced in a computer program. As the human subject performs a skill, his or her actions are recorded along with the situation that gave rise to the action. A log of these records is used as input to a learning program. The learning program outputs a set of rules that reproduce the skilled behavior. Here, the discriminator module 240 determines both the difference between the predicted path and the actual path (i.e., the variance factor), as well as the benefit for change in the model based on the variance factor, to determine if and how much to change the autonomous driving model, in light of the difference between the predicted path and the actual path. The benefit of the variance factor can be determined in light of numerous factors regarding safety and efficiency, such as the mechanical limits of the vehicle, road conditions, known vehicle responsiveness limitations, or other information. As such, the adversarial learning system 170, described herein, can produce autonomous driving model(s) which incorporate the benefits of an expert human driver while seeking mechanical precision based on avoidance of dangers or imperfections of human driving generally.

As stated, the variance factor can be used for updating the autonomous driving model(s) by the discriminator module 240. In this regard, the discriminator module 240 can improve the predicted paths based on deviations from the path executed by the expert driver. The improvements do not have to perfectly match the expert driver, and can be slight adjustments, based on the determinations described above. In implementations which use an average variance factor, the variance factor can be used to modify the autonomous driving model(s) to produce ranked predicted paths according to the desired variance factor (e.g., meaning it is closest to what the expert driver should do under a certain situation in light of safety). The desired predicted paths can be used for selecting a path to implement during autonomous driving (e.g., using the autonomous driving module 160). In this way, through comparison to expert human behavior, the adversarial learning system 170 can produce predicted models which provide safer and more efficient control of the vehicle than expert human drivers.

Figure 3:
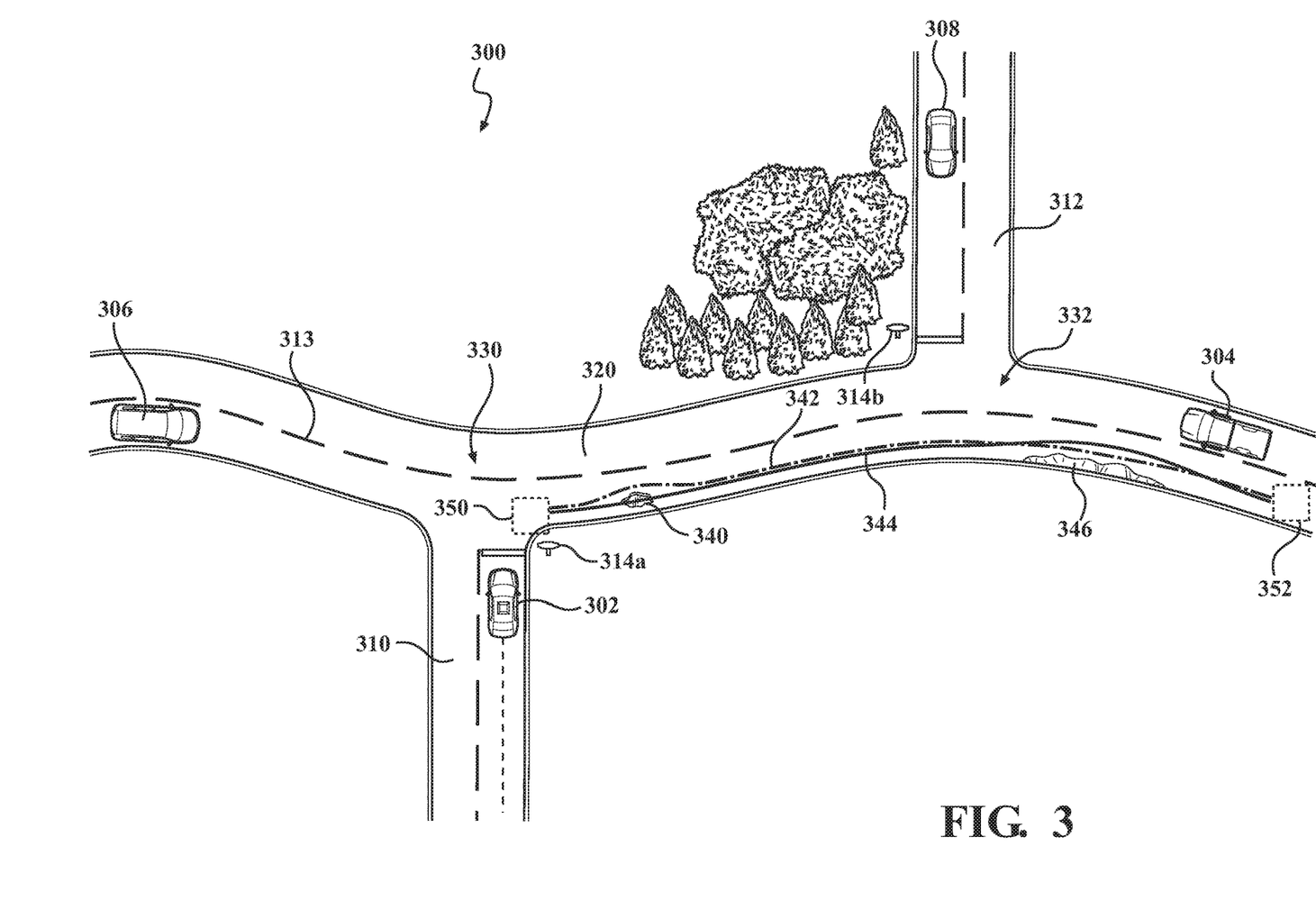
FIG. 3 is an aerial view of a vehicle employing an adversarial learning system in a vehicular environment, according to one embodiment.

FIG. 3 depicts the adversarial learning system 170 as used in an environment 300, according to one embodiment. The adversarial learning system 170 can include the elements described above with reference to FIGS. 1 and 2, such as the processor 110, the database 250. The adversarial learning system 170 can be used as part of the autonomous vehicle 302 for obtaining environmental data, detecting objects, generating the predicted path and comparing the predicted path to the actual path. As such, the adversarial learning system 170 can include the sensor systems 120 or any other device or unit for obtaining a representation of or information about the objects or the environment. An autonomous vehicle 302, depicted in FIG. 3, can include modules of the adversarial learning system 170 stored in the memory 210, as described with reference to FIGS. 1 and 2.

The environment 300 can be a vehicle environment. The vehicle environment, as used herein, is defined as an area, covered by the field of detection for the sensor system, having a primary purpose of operating or storing a vehicle. Examples of vehicle environments include highways, intersections, parking lots, airports, bike paths, race tracks, off-road tracks, or other environments in which vehicles operate. The environment 300 can include a plurality of objects. Objects in the environment can include pedestrians, motorized vehicles (both autonomous and human-operated), human powered vehicles (e.g., bicycles, skateboards, etc.) and/or other objects which can affect control considerations in the operation of an autonomous vehicle or human-operated vehicle.

The adversarial learning system 170, included as part of the vehicle 100, and the sensor systems 120, is shown incorporated in the autonomous vehicle 302. The adversarial learning system 170, as positioned in or on the autonomous vehicle 302, can view or otherwise detect the entirety of the environment 300 with minimal obstruction. The environment 300, depicted here, is a vehicle environment, as described above. Shown here, the environment 300 has a first road 310 a second road 312 and a third road 320. The first road 310 and the second road 312 intersect with the third road 320 at separate locations. Traffic in the environment 300 is primarily controlled by stop signs 314a and 314b and road surface markings 313, which include lines separating traffic, arrows indicating the proper lanes for turns and crosswalks for pedestrian traffic. In one embodiment, the adversarial learning system 170 can include instructions for the detection module 220, the generator module 230, the discrimination module 240, or combinations thereof. In one embodiment, the autonomous vehicle 302 can include the adversarial learning system 170, the sensor systems 120, the database 250, the processor 110, and other systems and device, as implemented in the vehicle 100. The database 250 can also contain instructions for modules 220, 230, and 240, as described with reference to FIGS. 1 and 2. Below, we discuss the interaction between the autonomous vehicle 302 and the environment 300, with reference to the examples.

Shown here, the detection module 220 of the adversarial learning system 170 is being executed by the processor 110 of the autonomous vehicle 302, causing the processor 110 to receive current state, the historical states and the context information from the sensor systems 120 to monitor the vehicle with respect to environment 300. The adversarial learning system 170, through execution by the processor 110, detects numerous components of the environment 300, including the first road 310, the second road 312, the stop sign 314, the road surface markings 313 (including arrows, crosswalks, and lane indicators), the intersection 330, the intersection 332, and the objects in the environment (shown here as a first automobile 304, a second automobile 306, and a third automobile 308). Objects such as the first road 310, the second road 312, the stop signs 314a and 314b, the road surface markings 313, the intersection 330, and the intersection 332 can be referred to as stationary objects, as their pose in the environment does not substantially change. The detection module 220 can further include instructions to differentiate between stationary objects and dynamic objects. The environmental data, collected by the detection module 220, can further include seasonal data, weather data or other atmospheric data.

The detection module 220 operates to, through instructions executed by the processor, collect information regarding the current state, the historical states and the context information. In the embodiment, the autonomous vehicle 302 is depicted as positioned at the intersection 330. The detection module 220 of the adversarial learning system 170 provides instructions, when executed by the processor 110, causes the processor 110 to receive the current states, the historical states, and context information about a vehicle. The information which is included in the current states, the historical states and the context information can be derived form a number of sources. The sources can include the sensor systems 120, the vehicle systems 140, the autonomous driving module 160, or combinations thereof. The detection module 220 can receive a variety of inputs, such as from the sensor systems 120, described above with reference to FIG. 1. As shown here, the current state corresponds to the current position of the vehicle, and the historical states correspond to a path that the vehicle previously took. The current states, the historical states and the context information can be as described with reference to FIG. 2. The current states, shown here, can include the current position (e.g., the position of the autonomous vehicle 302 at the stop sign 314*a*), the current pose, and a variety of engine parameters which indicate response time and performance of the autonomous vehicle 302. The current states of the vehicle can further include data regarding the vehicle's interaction to the environment, including traction, braking issues, relationship of the vehicle to road surface markings and the like. The historical states can include details related to the autonomous vehicle 302, including previous actions or positions. Shown here, the autonomous vehicle 302 has previously traveled up the first road 310, to the road surface marking 313 in front of the stop sign 314*a*. The first historical state of the autonomous vehicle 302 includes data regarding the vehicle itself, such as the controls for the steering, throttle, brake, shifters, directional components, trajectory, and other information collected prior to the current position of the autonomous vehicle 302. The historical states, in this embodiment, are derived from the sensor system 120, the vehicle systems 140, and the historical state information 260.

The autonomous vehicle further collects context information that relates to the vehicle's current environment (e.g., map data, sensor data, etc.). In this embodiment, the context information collected by the autonomous vehicle 302 includes elements which are static in the environment, such as wooded area 316, the stop signs 314*a* and 314*b*, the roads 310, 312, and 320, pothole 340 and road surface markings 313. The context information can further include dynamic objects. Shown here, the dynamic objects are the first automobile 304, the second automobile 306, and the third automobile 308. In detecting the environment 300, the autonomous vehicle 302 detects the motion of the first automobile 304, the second automobile 306, and the third automobile 308. The autonomous vehicle 302 then concludes that the first automobile 304 is approaching the intersection 332, the second automobile 306 is approaching the intersection 330 and the third automobile 308 is approaching the stop sign 314*b*. At this point, the first context information, the first current state and the first historical state are then forwarded to the detection module 220 of the adversarial learning system 170. As well, the first context information can be stored in a database, such as context information 280 in the database 250, described with reference to FIG. 2.

The detection module 220 can then, through instructions executed by the processor 110, encode a first input using the first current state, the first historical state, and the first context information. The detection module 220 receives and formats the above described inputs to provide data to the generator module 230 and the discriminator module 240. Shown here, the detection module 220 receives data such as the first context information, the first current state of the vehicle and the first historical state of the vehicle, from the autonomous vehicle 302 at or around the origin 350. The detection module 220 then produces a first input for the generator module 230. The first input can include predicted states, predicted actions and predicted observations of the vehicle or of other objects within the environment, such as the above described movements of the first automobile 304, the second automobile 306, and the third automobile 308.

The first input can then be transferred by the detection module 220 of the autonomous vehicle 302 to the generator module 230. The generator module 230 can include instructions that, when executed by the processor 110, generate a predicted path using the first input. The predicted path is a path for a specific route, based on modeled information, that is intended to replicate optimal driving behaviors from a starting point (e.g., an origin) to a finish point (e.g., a destination). The generator module 230 of the autonomous vehicle 302 receives the first input from the detection module 220. Then, the generator module 230 references the database for the autonomous driving model(s) included in the path generation information 270. Using the autonomous driving model(s) and the first input, the generator module creates the predicted path 342 between the origin 350 and the destination 352.

The expert driver, during the above data collection and calculations at the detection module 220 and the generator module 230, is driving the actual path 344. This can be referred to as a learning mode, as described above with reference to FIG. 2. During the human driving, the detection module 220 is collecting further information for the second input. The detection module 220 can then, through instructions executed by the processor 110, encode a second input using the second current state, the second historical state, and the second context information. In some embodiment, the first current state can be moved into the historical state information, such as historical state information 260. The detection module 220 receives and formats the above described inputs to provide data to the discriminator module 240. As well, the second input includes the actual path 344, which can then be forwarded to the discriminator module 240 for comparison, as described with reference to FIG. 2. Shown here, the detection module 220 receives data such as the second context information, the second current state of the vehicle and the second historical state of the vehicle, from the autonomous vehicle 302, from at least at or around the destination 352. The detection module 220 then produces a second input for the discriminator module 240. The second input can include predicted states, predicted actions and predicted observations of the vehicle, or of other objects within the environment, such as the above described movements of the first automobile 304, the second automobile 306, and the third automobile 308.

Shown here, the expert driver is driving the autonomous vehicle 302. Due to the expert driver's expertise in driving, the actual path chosen by the expert driver for the autonomous vehicle 302 avoids a number of problems from the predicted path. The expert driver first notices that the second automobile 306 is approaching far too slowly. As such, she enters into traffic over the origin 350 from the first road 310 to the third road 320. Second, she notices that the position of the wheels allows for her to pass over the pothole 340, without taking evasive actions called for by the predicted path. Third, the predicted path, shown here, falsely anticipates a wide turn from the second automobile 306, which the expert driver correctly doesn't expect. Fourth, the expert driver notices a steel decline from a sunken road patch 346, which she chooses make the autonomous vehicle 302 avoid, based on her experience driving. The expert driver then continues driving the autonomous vehicle 302 to a safe location after crossing the destination 352. The actual path 344 is received and stored by the detection module, such as detection module 220, in preparing the second input for the discriminator module 240.

The discriminator module 240 can, through instructions executed by the processor 110, receive the predicted path from the generator module 230 and receive the second input from the detection module 220. The predicted path can be forwarded to a variety of systems and modules within and outside of the autonomous vehicle 302. Shown here, the predicted path is forwarded to the autonomous driving module 160 and to the discriminator module 240. The detection module 220 then forwards the second input, including the actual path, to the discriminator module 240. The discriminator module 240 then compares the points of variance between the predicted path 342 and the actual path 344 to create a variance factor. The variance factor here includes the difference at the entrance to the intersection, the pothole 340, the false correction at the intersection 332, and correction at the sunken road patch 346.

This information is converted by the discriminator module 240 into the variance factor and used for model correction and adjustment. The variance factor at specific temporally related points of reference can be applied to the autonomous driving model(s), such that the model prediction under a specific situation is adjusted. Shown here, the autonomous driving model(s) are adjusted by increasing or reducing compensation of the vehicle in light of the variance factor at one or more of the points above in the predicted path. In some embodiments, the variance factor is applied only to a portion of the autonomous driving model(s), such as to specific decisions within the predicted path, specific decision types or to specific time frames of the predicted path. Further, the variance factor can be used to modify non-temporally related portions of the predicted path, such as time T=2 of the actual path being used to modify time T=6 of the predicted path. Modification of the predicted path can be chosen based on temporal relation, similarity in decision making, similar location, and similar type of location or other associations.

Figure 4:
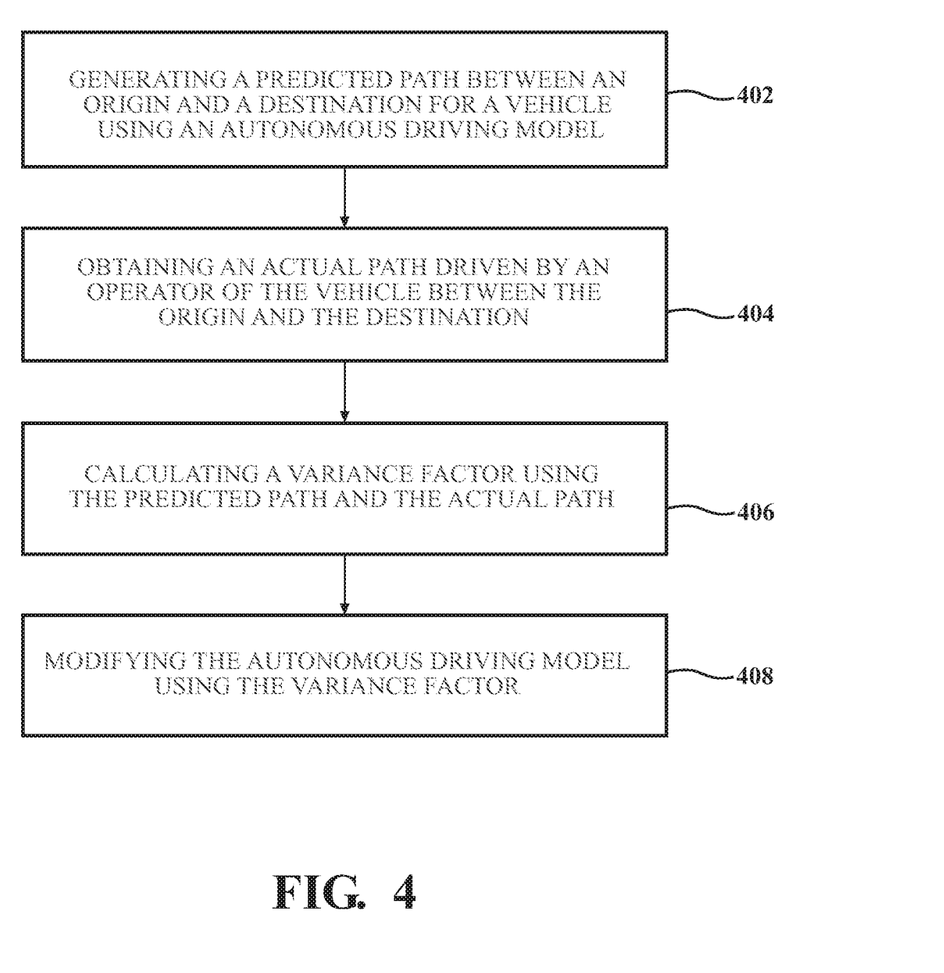
FIG. 4 is a flow diagram of a method for using adversarial learning to improve predictive modeling, according to embodiments described herein.

FIG. 4 is a flow diagram of a method for path comparison in autonomous vehicle learning, according to embodiments described herein. The method 400 can use information from the environment and about the autonomous vehicle to create a predicted path. The predicted path can then be compared to an actual path, such that the predicted path and related models can be updated. The method 400 can begin by generating a predicted path between an origin and a destination for a vehicle using an autonomous driving model, at 402. An actual path driven by an operator of the vehicle can then be obtained between the origin and the destination, at 404. A variance factor can then be calculated using the predicted path and the actual path, at 406. The autonomous driving model can then be modified using the variance factor, the modified model useable to autonomously drive the vehicle, at 408.

The method 400 can begin by generating a predicted path between an origin and a destination for a vehicle using an autonomous driving model, at 402. In some embodiments, generating the predicted path can include receiving a current state, a historical state, and context information of a vehicle, and detecting a first input using the first current state, the first historical state, and the first context information. The first current state can be collected at an instantaneous point in time or a correlated window in time. For example, the first current state can be an instant of time at T=0. In another example, the first current state can be a period of time related to T=0, such as a 15 second window from time T=0 to T=15. The first current state can be as related to a vehicle, including pose, engine data, velocity, acceleration and other current vehicle information. The first historical state includes past actions of the vehicle, such as the controls for the vehicle's steering, throttle, brake, shifters, directional components, trajectory, and the like. The first historical state can be collected by the vehicle over time, such as by accumulating the data collected in the current states. The first context information contains data that relates to the vehicle's current environment, such as map data, sensor data, and other data from the environment, as detectable from or around the vehicle. The first context information can be collected locally, remotely or both. In one example, the first context information includes data collected by a sensor system, local to the vehicle at the origin, and satellite imagery of the environment. The first current state, the first historical state and the first context information can be substantially as described with reference to FIG. 2. The first input can then be encoded using the first current state, the first historical state, and the first context information.

The first current state, the first historical state, and the first context information may be collected as part of a system, such as described with reference to the detection module 220 of the adversarial learning system 170. The first historical state can be provided as part of the historical state information 260, and the first context information can be available as part of the context information 280, which can be stored in a database 250. The detection of the first input can be performed by a module, such as the detection module 220, described with reference to FIG. 2.

The first input can include data which provides guidance in the production of a predicted path for an autonomous vehicle. The first input can be processed and compared to autonomous driving model(s). The autonomous driving model(s) can include previously collected information regarding expert driver's interaction with an environment as well as expectations of expert driver behavior, as determined computationally. The first input is associated with the autonomous driving model(s) to determine the predicted path. The predicted path is the path that the vehicle is expected to take between the origin and the destination. The predicted path can include the specific locations through which the vehicle is expected to move in the environment. As well, the predicted path can include information about vehicle behavior and performance at each of the above specific locations. Vehicle behavior and performance can include pose of the vehicle or components thereof, acceleration, braking, deceleration, velocity, and others.

In one embodiment, the predicted path can be generated by a system, a module as applied by an autonomous vehicle, such as the generator module 230 of the adversarial learning system 170, described with reference to FIGS. 1 and 2. The autonomous driving model(s) can be stored in a database, such as the autonomous driving model(s) which are part of the path generation information 270 in the database 250. The database 250 can be part of a vehicle, such as the vehicle 100.

An expert driver, during the above data collection and calculations, can be driving the actual path. This can be referred to as a learning mode, as described above with reference to FIG. 2. The actual path chosen by the expert driver for the vehicle may differ from the predicted path. The actual path can reflect a more expert performance of driving operation, including object avoidance, maneuvering and vehicle handling. In one embodiment, the actual path can be the path, driving actions, or both, as collected from an expert driver. In another embodiment, the actual path can be the path, driving actions, or both, as collected from a non-expert driver or a typical driver. The actual path can further be a collection of information from a plurality of drivers, expert or non-expert, over a period of time. During the human driving, the method 400 can collect information about the vehicle and the path, which represents the actual path. As well, the second input includes the actual path 344, which can then be forwarded to the discriminator module for comparison, as described with reference to FIG. 2.

An actual path driven by an operator of the vehicle can then be obtained between the origin and the destination, at 404. The actual path of the driver can be received, in part, from a second current state, the historical state, the context information and an actual path of the vehicle, and a second input can be encoded from said states and information. During the human driving, further information providing the second current state can be collected for the second input. As above, the second current state can be collected at an instantaneous point in time or a correlated window in time. The second input can include a second current state which replaces the current state. The first current state can be moved into the historical state information 260, such as for use in the second historical state. The second current state can be as related to a vehicle, including pose, engine data, velocity, acceleration and other current vehicle information. The historical state includes past actions of the vehicle, such as the controls for the vehicle's steering, throttle, brake, shifters, directional components, trajectory, and the like. With regards to the second input, the second historical state can also include the first current state, as collected for the first input. The context information data that relates to the vehicle's current environment, such as map data, sensor data, and other data from the environment as detectable from or around the vehicle. The context information can be substantially the same as used for the first input. In another embodiment, the context information can including context information collected at both the origin and the destination. The context information can be collected locally, remotely or both. The second input can then be encoded using the current state, the historical state, and the context information.

Then, a variance factor can be calculated using the predicted path and the actual path, at 406. The variance factor is a statistical comparison of the difference between the predicted path and the actual path. The variance factor can further include data of the first input, as associated with the predicted path, and data of the second input, as associated with the actual path. The variance factor can include one or more components, which reflect a variety of levels of comparison. In one embodiment, the variance factor can include a single number, which is a comparison of the overall actual path to the overall predicted path. In another embodiment, the variance factor can include a plurality of numbers which indicate a temporal comparison of the actual path and the predicted path over a period of time. The period of time can be the time frame from the origin to the destination, or any component thereof. The variance factor can be a number or a scale of numbers indicating convergence or divergence. In one example, the variance factors is a scale of numbers between 1 and 0, where 1 indicates complete convergence and 0 indicates complete divergence. In this case, the predicted path and the actual path are compared to determine, on the scale described, how much the predicted path differs from the actual path.

Finally, the autonomous driving model can be modified using the variance factor, the modified model useable to autonomously drive the vehicle, at 408. The variance factor can be incorporated as part of the autonomous driving model(s), based on benefit to efficiency and safety, as determined by the discriminator model. As such, only portions of the variance factor can be applied. Further, the variance factor may be applied, but magnitude of variance may be altered to achieve desired benefit as determined by the method 400. The benefit of the variance factor can be determined in light of numerous factors regarding safety and efficiency, such as the mechanical limits of the vehicle, road conditions, known vehicle responsiveness limitations, or other information.

The variance factor and application of the variance factor to the autonomous driving model(s) can be determined as part of a system, such as the adversarial learning system 170, described with reference to FIG. 2. Here, the variance factor can be created using the discriminator module 240, by the execution of instructions at the processor 110. The variance factor can then be used to modify a model driving behavior, such as the autonomous driving model(s), as stored in the database 250 as the path generation information 270. The discriminator module 240 can forward the variance factor to the generator module 230. The generator module 230 can then receive the path generation information from the database 250, and modify the expert driving model(s), as described with reference to FIGS. 2 and 3.

The systems and methods for adversarial learning, described above, allow for constant improvement in autonomous driving. By comparing human driving paths to predicted paths, the predicted paths can incorporate expert human responses into their driving models. This will allow for improved handling and control during autonomous operation, les jerking or swerving and better obstacle prediction. Further, better driving models can provide for a longer useful life of the vehicle and better passenger satisfaction.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flowcharts and block diagrams in the figures illustrate the architecture, functionality, and operation of possible embodiments of systems, methods and computer program products according to various embodiments. In this regard, each block in the flowcharts or block diagrams can represent a module, segment, or portion of code, which comprises one or more executable instructions for implementing the specified logical function(s). It should also be noted that, in some alternative embodiments, the functions noted in the block can occur out of the order noted in the Figures. For example, two blocks shown in succession can, in fact, be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the embodiment of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by or in connection with an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

While the foregoing is directed to embodiments of the disclosed devices, systems, and methods, other and further embodiments of the disclosed devices, systems, and methods can be devised without departing from the basic scope thereof. The scope thereof is determined by the claims that follow.

What is claimed is:

1. An adversarial learning system for path comparison in autonomous learning, comprising:
   one or more processors; and
   a memory communicably coupled to the one or more processors and storing instructions that when executed by the one or more processors cause the one or more processors to:
   generate a predicted path between an origin and a destination for a vehicle using an autonomous driving model;
   obtain an actual path driven by an operator of the vehicle between the origin and the destination;
   calculate a variance factor using the predicted path and the actual path;
   modify the autonomous driving model using the variance factor, the variance factor being applied only to a portion of the autonomous driving model pertaining to at least one of: specific decisions, specific decision types, or specific time frames within the predicted path, a magnitude of the variance factor being altered based on at least one of: mechanical limits of the vehicle, road conditions, known vehicle responsiveness limitations; and
   using the modified autonomous driving model to autonomously drive the vehicle.

2. The adversarial learning system of claim 1, wherein the memory stores further instructions that when executed by the one or more processors cause the one or more processors to:
   encode a first input using a first current state and a first historical state, the first current state being received from a sensor system of the vehicle at the origin, and generate the predicted path using the first input.

3. The adversarial learning system of claim 2, wherein the first current state is collected over a period time before the predicted path is generated.

4. The adversarial learning system of claim 2, wherein the memory stores further that when executed by the one or more processors cause the one or more processors to:
   encode a second input using the first current state, a second current state, a second historical state, and the actual path, the second current state being received from a sensor system of the vehicle at the destination, and
   calculate the variance factor using the first input and the second input.

5. The adversarial learning system of claim 4, wherein the second current state is collected at the destination or at a destination point.

6. The adversarial learning system of claim 4, wherein the second historical state comprises the first historical state and the first current state.

7. The adversarial learning system of claim 1, wherein the variance factor is a numerical indicator of convergence or divergence between the actual path and the predicted path.

8. The adversarial learning system of claim 1, wherein the variance factor being calculated in light of six degrees of freedom for the vehicle.

9. The adversarial learning system of claim 1, further including:
using the variance factor to rank paths according to which path has the highest variance factor and selecting the paths having the ranked highest variance factor for implementation during autonomous driving.

10. The adversarial learning system of claim 1, wherein obtain an actual path driven by an operator of the vehicle between the origin and the destination includes obtain an actual path driven by a plurality of drivers including at least one expert driver.

11. A non-transitory computer-readable medium for path comparison in autonomous learning and storing instructions that when executed by one or more processors cause the one or more processors to:
generate a predicted path between an origin and a destination for a vehicle using an autonomous driving model;
obtain an actual path driven by an operator of the vehicle between the origin and the destination;
calculate a variance factor using the predicted path and the actual path;
modify the autonomous driving model using the variance factor, the variance factor being applied only to a portion of the autonomous driving model pertaining to at least one of: specific decisions, specific decision types, or specific time frames within the predicted path, a magnitude of the variance factor being altered based on at least one of: mechanical limits of the vehicle, road conditions, known vehicle responsiveness limitations; and
using the modified autonomous driving model to autonomously drive the vehicle.

12. The non-transitory computer-readable medium of claim 11, further comprising instructions to encode a first input using a first current state and a first historical state, the first current state being received from a sensor system of the vehicle at the origin, and to generate the predicted path using the first input.

13. The non-transitory computer-readable medium of claim 12, wherein the first current state is collected over a period time before the predicted path is generated.

14. The non-transitory computer-readable medium of claim 12, further comprising instructions to encode a second input using the first current state, a second current state, a second historical state, and the actual path, the second current state being received from a sensor system of the vehicle at the destination, and to calculate the variance factor using the first input and the second input.

15. The non-transitory computer-readable medium of claim 14, wherein the second current state is collected at the destination.

16. The non-transitory computer-readable medium of claim 14, wherein the second historical state comprises the first historical state and the first current state.

17. The non-transitory computer-readable medium of claim 11, wherein the variance factor is a numerical indicator of convergence or divergence between the actual path and the predicted path.

18. A method for path comparison in autonomous learning, comprising:
generating a predicted path between an origin and a destination for a vehicle using an autonomous driving model;
obtaining an actual path driven by an operator of the vehicle between the origin and the destination;
calculating a variance factor using the predicted path and the actual path; and
modifying the autonomous driving model using the variance factor, the variance factor being applied only to a portion of the autonomous driving model pertaining to at least one of: specific decisions, specific decision types, or specific time frames within the predicted path, a magnitude of the variance factor being altered based on at least one of: mechanical limits of the vehicle, road conditions, known vehicle responsiveness limitations; and
using the modified autonomous driving model to autonomously drive the vehicle.

19. The method of claim 18, further comprising detecting a first input using a first current state and a first historical state, the first current state being received from a sensor system of the vehicle at the origin, and generating the predicted path using the first input.

20. The method of claim 19, wherein the first current state is collected over a period time before the predicted path is generated.

21. The method of claim 19, further comprising detecting a second input using the first current state, a second current state, a second historical state, and the actual path, the second current state being received from a sensor system of the vehicle at the destination, and calculating the variance factor using the first input and the second input.

22. The method of claim 18, wherein the variance factor is a numerical indicator of convergence or divergence between the actual path and the predicted path.

* * * * *